United States Patent
Madambashi et al.

(10) Patent No.: US 12,535,111 B2
(45) Date of Patent: Jan. 27, 2026

(54) CALIPER FOR OPPOSED PISTON TYPE DISC BRAKE

(71) Applicant: AKEBONO BRAKE INDUSTRY CO., LTD., Tokyo (JP)

(72) Inventors: Asami Madambashi, Tokyo (JP); Tsuyoshi Suzuki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 320 days.

(21) Appl. No.: 18/133,126

(22) Filed: Apr. 11, 2023

(65) Prior Publication Data

US 2023/0341016 A1 Oct. 26, 2023

(30) Foreign Application Priority Data

Apr. 22, 2022 (JP) .................................. 2022-070675

(51) Int. Cl.
*F16D 65/00* (2006.01)
*F16D 55/00* (2006.01)

(52) U.S. Cl.
CPC .. *F16D 65/0068* (2013.01); *F16D 2055/0016* (2013.01)

(58) Field of Classification Search
CPC ......... F16D 65/0068; F16D 2055/0016; F16D 65/14; F16D 65/095
USPC ................................ 188/73.1, 73.46, 73.47
See application file for complete search history.

(56) References Cited

U.S. PATENT DOCUMENTS

| | | | |
|---|---|---|---|
| 5,464,077 A * | 11/1995 | Thiel ..................... | F16D 65/095 188/73.39 |
| 10,280,995 B2 * | 5/2019 | Lethorn ................ | F16D 55/228 |
| 2015/0027822 A1 * | 1/2015 | Cerutti ................ | F16D 65/0977 188/73.47 |

FOREIGN PATENT DOCUMENTS

| | | | | |
|---|---|---|---|---|
| EP | 2368057 A1 | | 9/2011 | |
| JP | 2009297784 A | | 12/2009 | |
| JP | 2012-514166 A | | 6/2012 | |
| JP | 2017172611 A | | 9/2017 | |
| JP | 2021181802 A | * | 11/2021 | ............ F16D 65/02 |
| WO | WO-2010-073277 A1 | | 7/2010 | |
| WO | 201507678 A1 | | 7/2015 | |

OTHER PUBLICATIONS

Japanese Office Action mailed Nov. 4, 2025 for Japanese patent application No. 2002-070675.

\* cited by examiner

*Primary Examiner* — Christopher P Schwartz
(74) *Attorney, Agent, or Firm* — Faegre Drinker Biddle & Reath LLP

(57) ABSTRACT

There is provided a caliper for an opposed piston type disc brake, including: an inner body including an inner cylinder portion; an outer body including an outer cylinder portion; and a rotation-in side connecting portion and a rotation-out side connecting portion. The end portions on both circumferentially outer sides of the outer body are connected to the rotation-in side connecting portion and the rotation-out side connecting portion, and the outer body includes a band-shaped reinforcing rib that covers a bottom portion of the outer cylinder portion from an axially outer side so as to cross the bottom portion in a circumferential direction. The reinforcing rib includes a bottomed or bottomless cut-out portion recessed in the axial direction on at least one of both circumferentially outer side portions.

13 Claims, 11 Drawing Sheets

CALIPER FOR OPPOSED PISTON TYPE DISC BRAKE

CROSS-REFERENCE TO RELATED APPLICATIONS

This application is based on Japanese Patent Application No. 2022-070675 filed on Apr. 22, 2022, the contents of which are incorporated herein by way of reference.

TECHNICAL FIELD

The present invention relates to a caliper constituting an opposed piston type disc brake device.

BACKGROUND

Disc brake devices are widely used for braking automobiles and motorcycles. At the time of braking by the disc brake device, a pair of pads disposed on both axial sides of a rotor rotating together with a wheel are pressed against both axial side surfaces of the rotor by a piston. There are disc brake devices having various structures in the related art, but since an opposed piston type disc brake device including pistons on both axial sides of a rotor can obtain a stable braking force, usage examples have been increased in recent years.

The opposed piston type disc brake device includes a caliper covering a rotor that rotates together with a wheel from a radially outer side and fixed to a vehicle body, and a pair of pads supported to be movable in an axial direction with respect to the caliper and disposed on both the axial sides of the rotor.

The caliper constituting the disc brake device for an automobile includes an inner body that is disposed on an axially inner side of the rotor, an outer body that is disposed on an axially outer side of the rotor, and a rotation-in side connecting portion and a rotation-out side connecting portion that are disposed on a radially outer side of an outer circumferential edge of the rotor and each of which connects an end portion on both circumferentially outer sides of an inner body and an end portion on both circumferentially outer sides of an outer body.

The inner body includes an inner cylinder portion, and an inner piston is fitted to the inner cylinder portion. The inner cylinder portion is open to an axially outer side surface of the inner body facing the rotor. The outer body has an outer cylinder portion, and an outer piston is fitted to the outer cylinder portion. The outer cylinder portion is open to an axially inner side surface of the outer body facing the rotor.

During braking, brake oil is fed from a master cylinder into each of the inner cylinder portion and the outer cylinder portion. Accordingly, the inner piston fitted to the inner cylinder portion is pushed out in the axial direction, and the pad supported by the inner body is pressed against an axially inner side surface of the rotor. Similarly, the outer piston fitted to the outer cylinder portion is pushed out in the axial direction, and the pad supported by the outer body is pressed against an axially outer side surface of the rotor. As a result, the rotor is strongly clamped from both the axial sides by the pair of pads, and braking of a vehicle is performed.

At the time of braking, the inner piston and the outer piston apply forces to the inner body and the outer body in directions away from each other in the axial direction as a reaction to press the pair of pads against both the axial side surfaces of the rotor. Therefore, when rigidity of the caliper is not sufficient, both the inner body and the outer body are elastically deformed in the directions away from each other in the axial direction, and a desired braking force may not be obtained. Further, when the rigidity of the caliper is not sufficient, the outer body is elastically deformed to be displaced in a rotation direction of the rotor with respect to the inner body at the time of braking, and vibration or noise may be generated.

In view of such circumstances, for example, JP2012-514166A (Patent Literature 1) discloses a structure in which a band-shaped reinforcing rib is provided on an axially outer side portion of an outer body. Specifically, in a structure of the related art described in JP2012-514166A, each of the rotation-in side connecting portion and the rotation-out side connecting portion is provided with a band-shaped reinforcing rib for connecting end portions on both circumferentially outer sides, and the reinforcing ribs cover bottom portions of two outer cylinder portions provided in the outer body from an axially outer side. In the structure of the related art having such a configuration, the rigidity of the outer body can be improved. Therefore, it is advantageous in terms of obtaining a desired braking force and suppressing the generation of vibration and noise.

Patent Literature 1: JP2012-514166A

Since the disc brake device is provided on a road surface side with respect to a spring constituting a suspension device in the vehicle, the disc brake device has a so-called unsprung load. Therefore, the caliper constituting the disc brake device is required to be reduced in weight for the purpose of improving fuel consumption performance and traveling performance of the vehicle, but the structure of the related art described in JP2012-514166A still has room for improvement in terms of both ensuring of rigidity and weight reduction.

The present invention has been made to solve the above problems, and an object thereof is to provide a caliper for an opposed piston type disc brake capable of ensuring rigidity and reducing weight.

SUMMARY

There is provided a caliper for an opposed piston type disc brake, including: an inner body including an inner cylinder portion and disposed on an axially inner side of a rotor; an outer body including an outer cylinder portion and disposed on an axially outer side of the rotor; and a rotation-in side connecting portion and a rotation-out side connecting portion which are disposed radially outward of an outer circumferential edge of the rotor and which connect end portions on both circumferentially outer sides of the inner body and end portions on both circumferentially outer sides of the outer body in an axial direction. The end portions on both circumferentially outer sides of the outer body are connected to the rotation-in side connecting portion and the rotation-out side connecting portion, and the outer body includes a band-shaped reinforcing rib that covers a bottom portion of the outer cylinder portion from an axially outer side so as to cross the bottom portion in a circumferential direction. The reinforcing rib includes a bottomed or bottomless cut-out portion recessed in the axial direction on at least one of both circumferentially outer side portions.

In the caliper for an opposed piston type disc brake according to one aspect of the present invention, the cut-out portion may have a shape elongated in the circumferential direction. The reinforcing rib may include side ribs extending in the circumferential direction on both radial sides of the cut-out portion. A total of two or more of the side ribs may be provided.

In the caliper for an opposed piston type disc brake according to one aspect of the present invention, each of the side ribs may extend in a direction closer to a central axis of the outer cylinder portion as each of the side ribs is toward a circumferentially inner side.

In the caliper for an opposed piston type disc brake according to one aspect of the present invention, the cut-out portion may be provided on a radially intermediate portion of the reinforcing rib. The side rib disposed on a radially outer side of the cut-out portion may be inclined in a direction toward a radially inner side as the side rib is toward the circumferentially inner side. The side rib disposed on a radially inner side of the cut-out portion may be inclined in a direction toward a radially outer side as the side rib is toward the circumferentially inner side.

In this case, the side rib disposed on the radially inner side of the cut-out portion may be connected to an end portion on a circumferentially outer side of the rotation-in side connecting portion or the rotation-out side connecting portion.

In the caliper for an opposed piston type disc brake according to one aspect of the present invention, a radial thickness of the side rib disposed on a radially outer side of the cut-out portion may be larger than a radial thickness of the side rib disposed on a radially inner side of the cut-out portion.

In the caliper for an opposed piston type disc brake according to one aspect of the present invention, when viewed from a radially outer side, the side rib disposed on a radially inner side of the cut-out portion may protrude outward from the side rib disposed on a radially outer side of the cut-out portion.

In the caliper for an opposed piston type disc brake according to one aspect of the present invention, the reinforcing rib may have a design surface having a flat surface shape formed by an axially outer side surface of the reinforcing rib on a circumferentially inner side portion thereof. The design surface and axially outer side surfaces of the side ribs may be smoothly connected to each other without steps.

In the caliper for an opposed piston type disc brake according to one aspect of the present invention, axially outer side surfaces of the side ribs may be inclined in a direction toward an axially inner side as the axially outer side surfaces are toward a circumferentially outer side.

In the caliper for an opposed piston type disc brake according to one aspect of the present invention, at least one of the side ribs may include a communication path through which brake oil is to pass.

In the caliper for an opposed piston type disc brake according to one aspect of the present invention, one of the cut-out portion may be provided on a radially intermediate portion of each of both circumferentially outer side portions of the reinforcing rib. Each of the cut-out portions may have a substantially triangular shape when viewed in the axial direction, and a radial width thereof may increase toward a circumferentially outer side. A portion of the reinforcing rib excluding the cut-out portions may have a substantially X-shape when viewed in the axial direction.

In this case, an axial thickness of the portion of the reinforcing rib excluding the cut-out portions may be larger at a portion deviated outward in the circumferential direction from the outer cylinder portion than at a portion covering the bottom portion of the outer cylinder portion.

In the caliper for an opposed piston type disc brake according to one aspect of the present invention, the cut-out portion may be bottomed.

Alternatively, the cut-out portion may be bottomless.

DESCRIPTION OF EMBODIMENTS

First Embodiment

Figure 1:
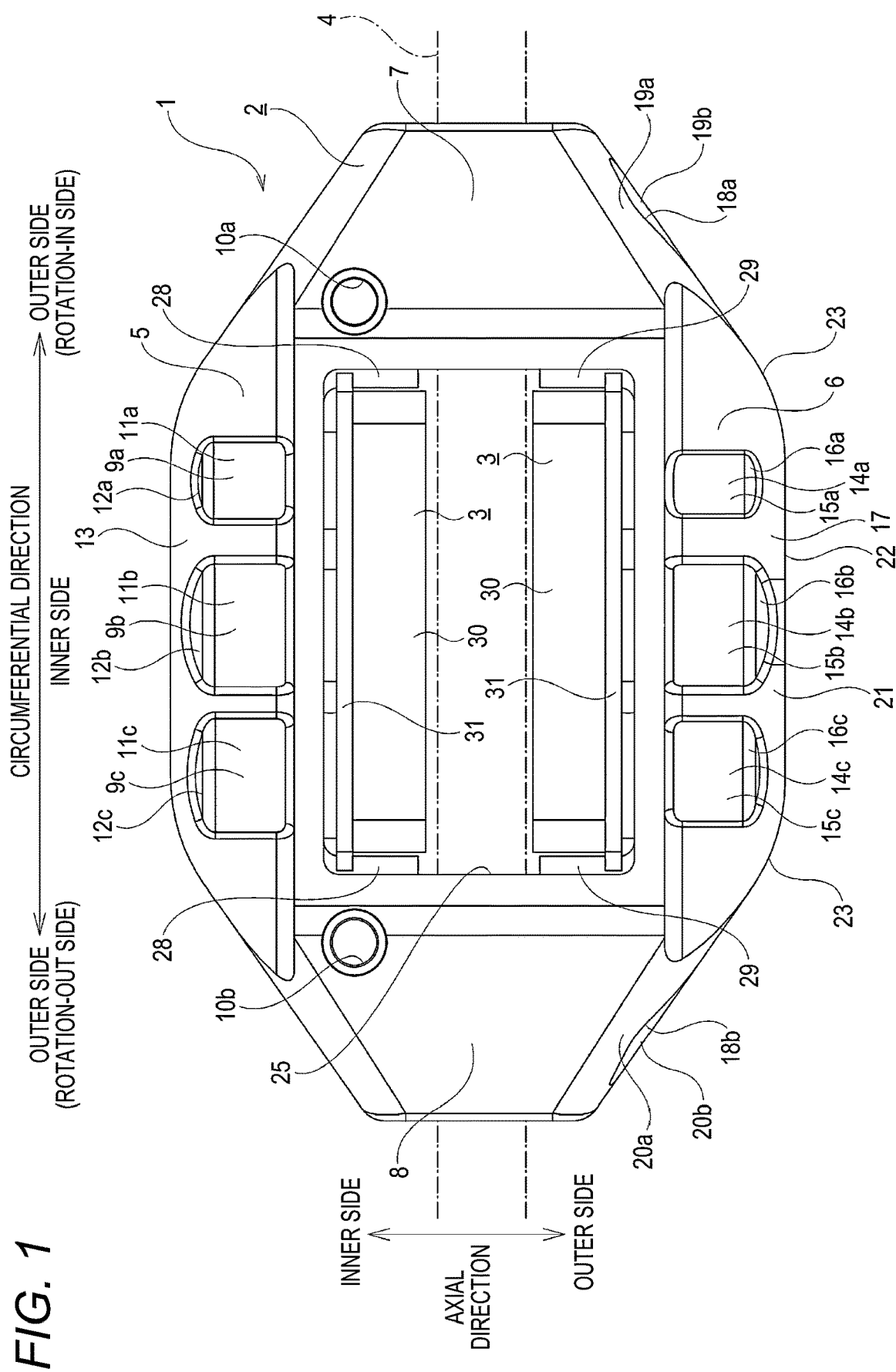
FIG. 1 is a plan view of an opposed piston type disc brake device according to a first embodiment as viewed from a radially outer side.

A first embodiment will be described with reference to FIGS. 1 to 8.

An opposed piston type disc brake device 1 of the present embodiment is used for an automobile, and includes a caliper 2 and a pair of pads 3 (an inner pad and an outer pad).

In the present specification and claims, an "axial direction", a "circumferential direction", and a "radial direction" refer to an axial direction, a circumferential direction, and a radial direction of a disc-shaped rotor 4 (see FIG. 1), unless otherwise specified. Further, a circumferentially inner side refers to a circumferentially central side of the opposed piston type disc brake device 1, and circumferentially outer sides refer to both circumferential sides of the opposed piston type disc brake device 1. Of the circumferentially outer sides, a rotation-in side refers to a side from which the rotor 4 rotating together with a wheel in a state of forward movement of a vehicle enters an inside of the caliper 2, and a rotation-out side refers to a side from which the rotor 4 comes off from an outside of the caliper 2.

<Caliper>

The caliper 2 covers the rotor 4 from a radially outer side, supports the pair of pads 3 to be movable in the axial direction (an upper-lower direction in FIGS. 1, 6, and 8, a front-back direction in FIGS. 2 and 3, and a left-right direction in FIGS. 4 and 5), and is integrally formed by subjecting a material made of a light alloy such as an aluminum alloy or an iron-based alloy to forging or the like.

The caliper 2 has a boat shape as a whole and a substantially bow shape as viewed in the axial direction. The caliper 2 includes an inner body 5 and an outer body 6 sandwiching the rotor 4 from both axial sides, and a rotation-in side connecting portion 7 and a rotation-out side connecting portion 8 each connecting an end portion on both circumferentially outer sides of the inner body 5 and an end portion on both circumferentially outer sides of the outer body 6 in the axial direction.

<<Inner Body>>

The inner body 5 is disposed on an axially inner side the rotor 4. The inner body 5 includes three inner cylinder portions 9a, 9b, and 9c and two attachment holes 10a, 10b.

The three inner cylinder portions 9a, 9b, and 9c are separated from each other in the circumferential direction. Each of the inner cylinder portions 9a, 9b, and 9c is formed in a bottomed cylindrical shape, and has a substantially columnar cylinder space therein. An inner piston (not shown) is fitted into the cylinder space of each of the inner cylinder portions 9a, 9b, and 9c so as to be displaceable in the axial direction. Each of the inner cylinder portions 9a, 9b, and 9c is disposed on a circumferentially inner side portion of the inner body 5, and is open to an axially outer side surface of the inner body 5 facing the rotor 4.

Figure 3:
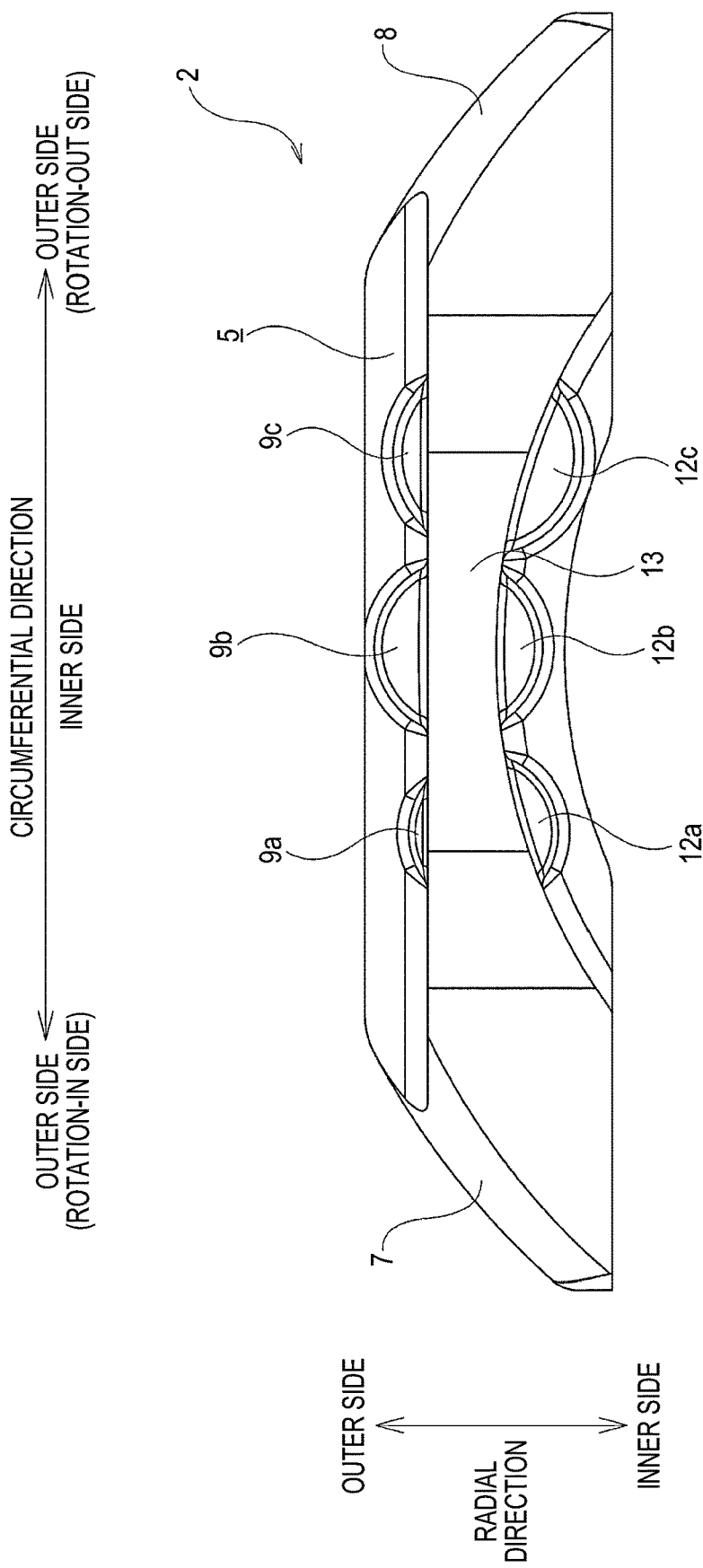
FIG. 3 is a rear view of the caliper taken out from the opposed piston type disc brake device according to the first embodiment, as viewed from an axially inner side.
Figure 4:
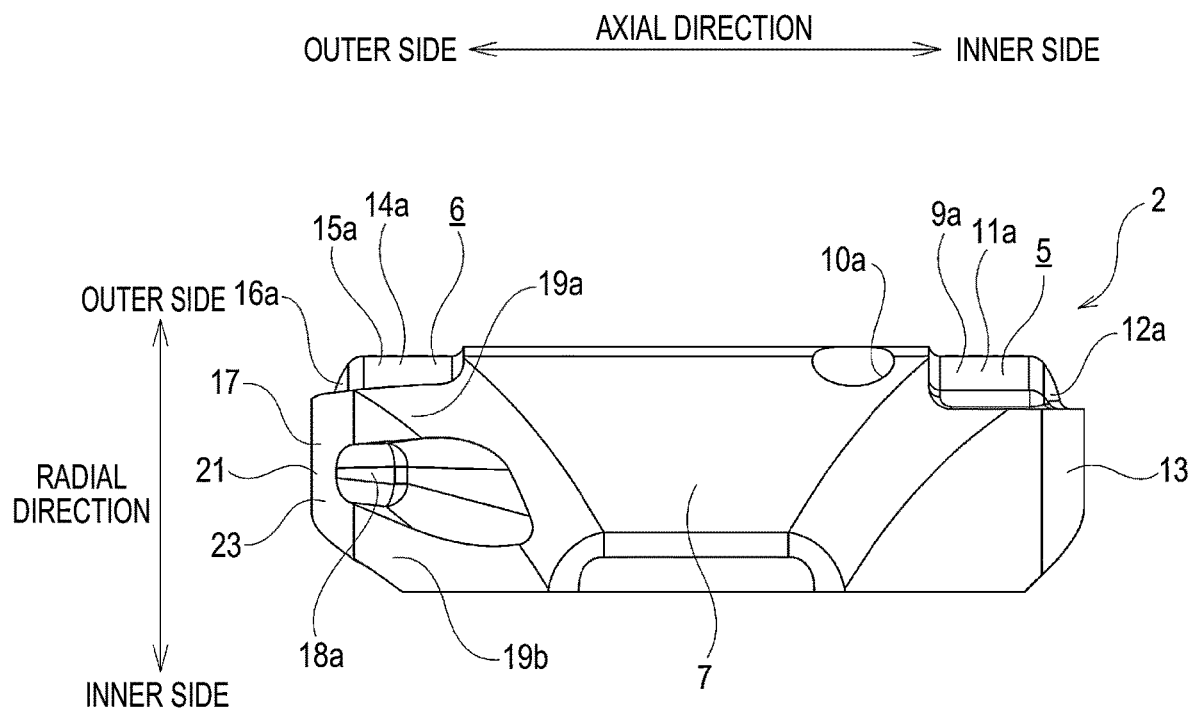
FIG. 4 is an end view of the caliper taken out from the opposed piston type disc brake device according to the first embodiment, as viewed from a rotation-in side.
Figure 5:
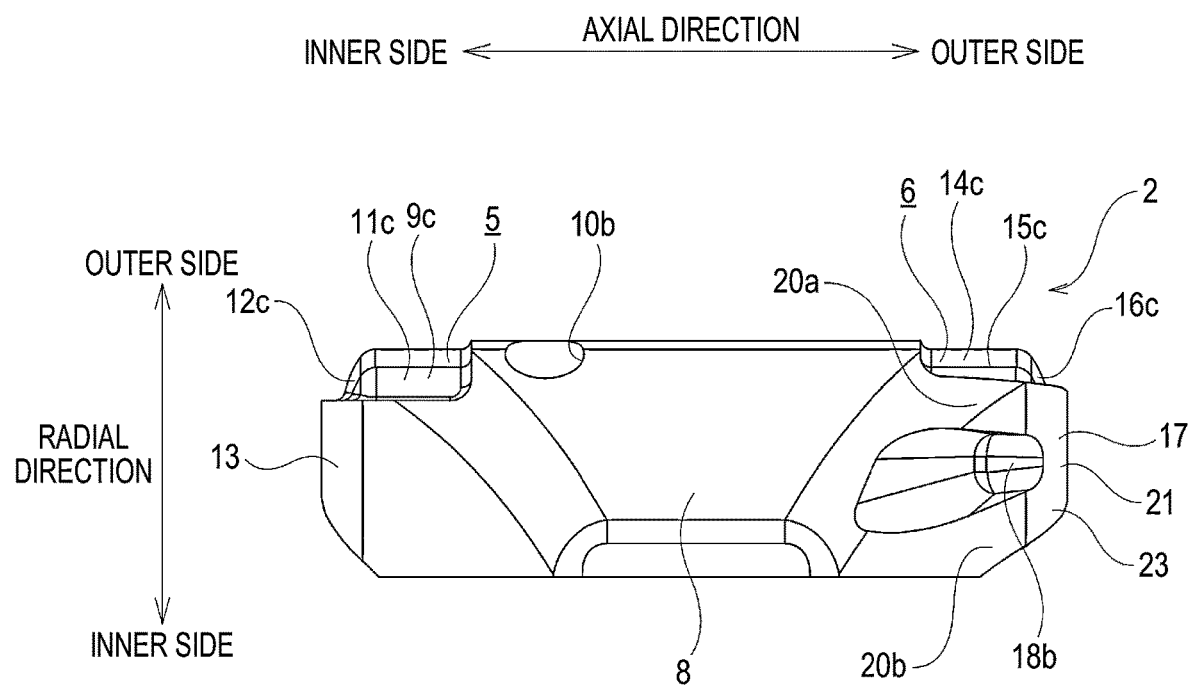
FIG. 5 is an end view of the caliper taken out from the opposed piston type disc brake device according to the first embodiment, as viewed from a rotation-out side.
Figure 6:
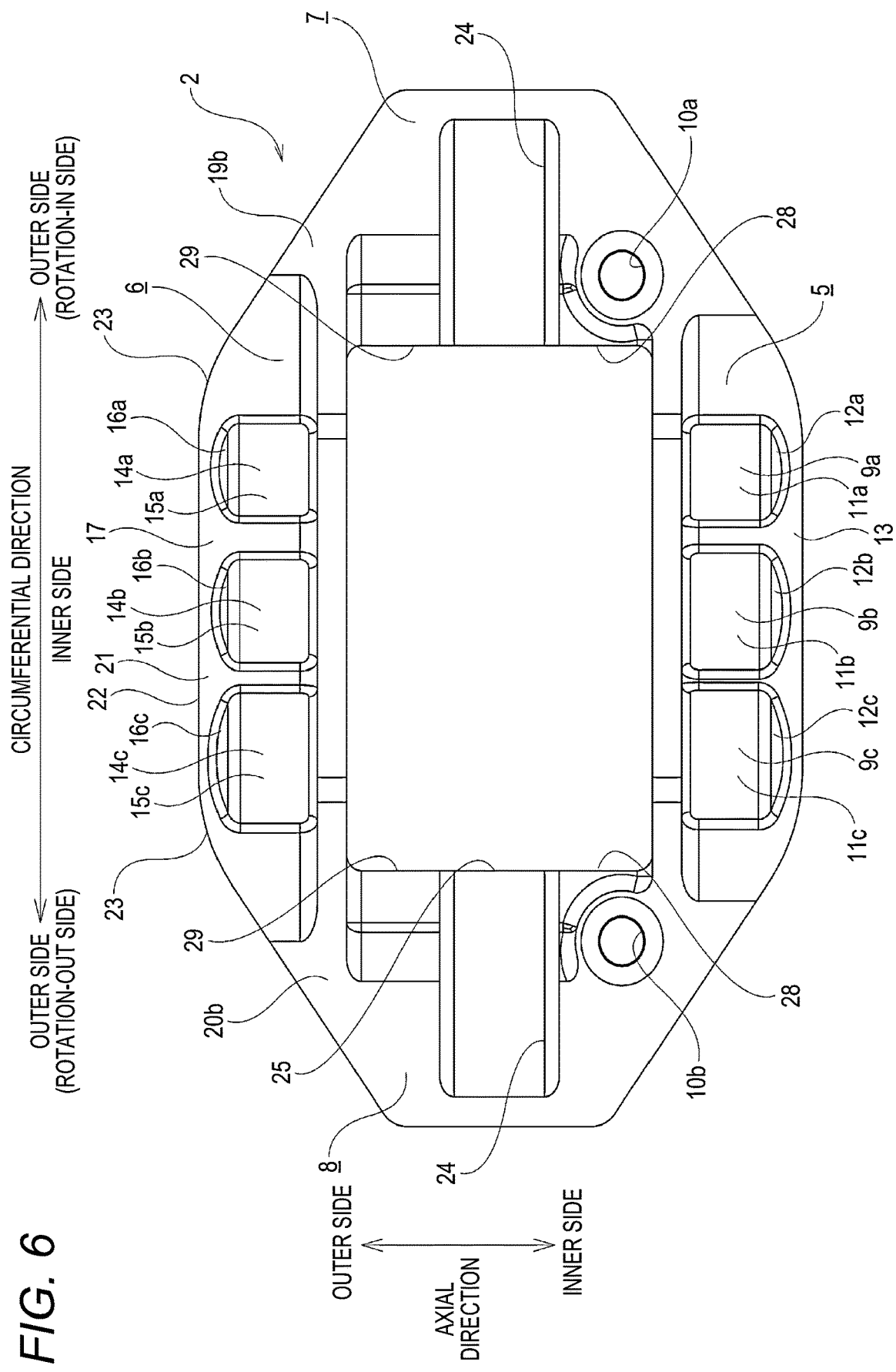
FIG. 6 is a bottom view of the caliper taken out from the opposed piston type disc brake device according to the first embodiment, as viewed from a radially inner side.
Figure 7:
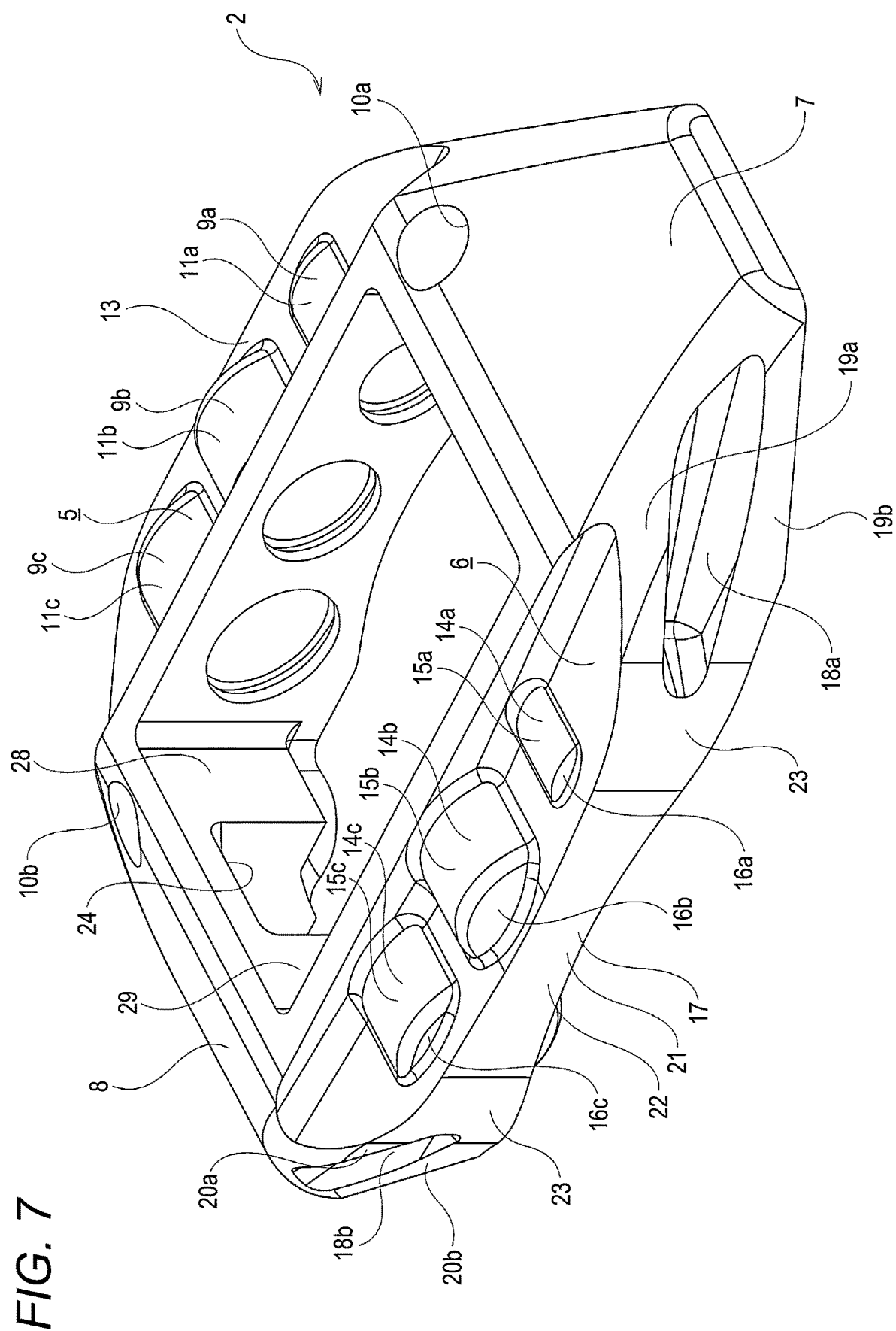
FIG. 7 is a perspective view showing the caliper taken out from the opposed piston type disc brake device according to the first embodiment.

Part of outer shapes of the inner cylinder portions 9a, 9b, and 9c having a bottomed cylindrical shape is exposed in the inner body 5. Specifically, as shown in FIG. 1, outer circumferential side portions of cylinder portions 11a, 11b, and 11c constituting the inner cylinder portions 9a, 9b, and 9c are exposed on a radially outer side surface of the inner body 5. Further, as shown in FIG. 6, inner circumferential side portions of the cylinder portions 11a, 11b, and 11c constituting the inner cylinder portions 9a, 9b, and 9c are exposed on a radially inner side surface of the inner body 5. Further, as shown in FIG. 3, circular bottom portions 12a, 12b, and 12c constituting the inner cylinder portions 9a, 9b, and 9c are exposed on an axially inner side surface of the inner body 5.

In the illustrated example, cylinder diameters of the three inner cylinder portions 9a, 9b, and 9c are different from each other. Specifically, among the cylinder diameters of the three inner cylinder portions 9a, 9b, and 9c, the cylinder diameter of the inner cylinder portion 9a disposed on the rotation-in side is the smallest, and the cylinder diameter of the inner cylinder portion 9c disposed on the rotation-out side is the largest.

The two attachment holes 10a, 10b are disposed on both circumferentially outer side portions of the inner body 5 so as to sandwich the three inner cylinder portions 9a, 9b, and 9c from both the circumferential sides. The caliper 2 is directly fixed to a knuckle constituting a suspension device of a vehicle body or fixed to the knuckle via an adapter (not shown) by using bolts (not shown) inserted through the attachment holes 10a, 10b from the radially outer side. Therefore, the caliper 2 of the present embodiment is a radial mount type caliper.

An inner reinforcing rib 13 is provided on an axially inner side portion of the inner body 5. The inner reinforcing rib 13 is a thick portion that is thicker than other portions and rises axially inward. Therefore, a thickness of the inner body 5 is increased at a portion where the inner reinforcing rib 13 is provided, and rigidity of the inner body 5 is improved.

The inner reinforcing rib 13 is formed in a band shape extending in the circumferential direction, and end portions on both circumferentially outer sides thereof are connected to the rotation-in side connecting portion 7 and the rotation-out side connecting portion 8. The inner reinforcing rib 13 covers the respective bottom portions 12a, 12b, and 12c constituting the inner cylinder portions 9a, 9b, and 9c from the axially inner side so as to cross the bottom portions 12a, 12b, and 12c in the circumferential direction.

The inner body 5 supports the inner side pad 3 disposed on an axially inner side of the rotor 4 to be movable in the axial direction. Therefore, inner side protruding portions 28 protruding in the axial direction are formed on both the circumferentially outer side portions of the axially outer side surface of the inner body 5.

<<Outer Body>>

The outer body 6 is disposed on an axially outer side of the rotor 4. The outer body 6 includes three outer cylinder portions 14a, 14b, and 14c.

The three outer cylinder portions 14a, 14b, and 14c are separated from each other in the circumferential direction. Each of the outer cylinder portions 14a, 14b, and 14c is formed in a bottomed cylindrical shape, and has a substantially columnar cylinder space therein. An outer piston (not shown) is fitted into the cylinder space of each of the outer cylinder portions 14a, 14b, and 14c so as to be displaceable in the axial direction. Each of the outer cylinder portions 14a, 14b, and 14c is disposed on a circumferentially inner side portion of the outer body 6, and is open to an axially inner side surface of the outer body 6 facing the rotor 4.

Figure 2:
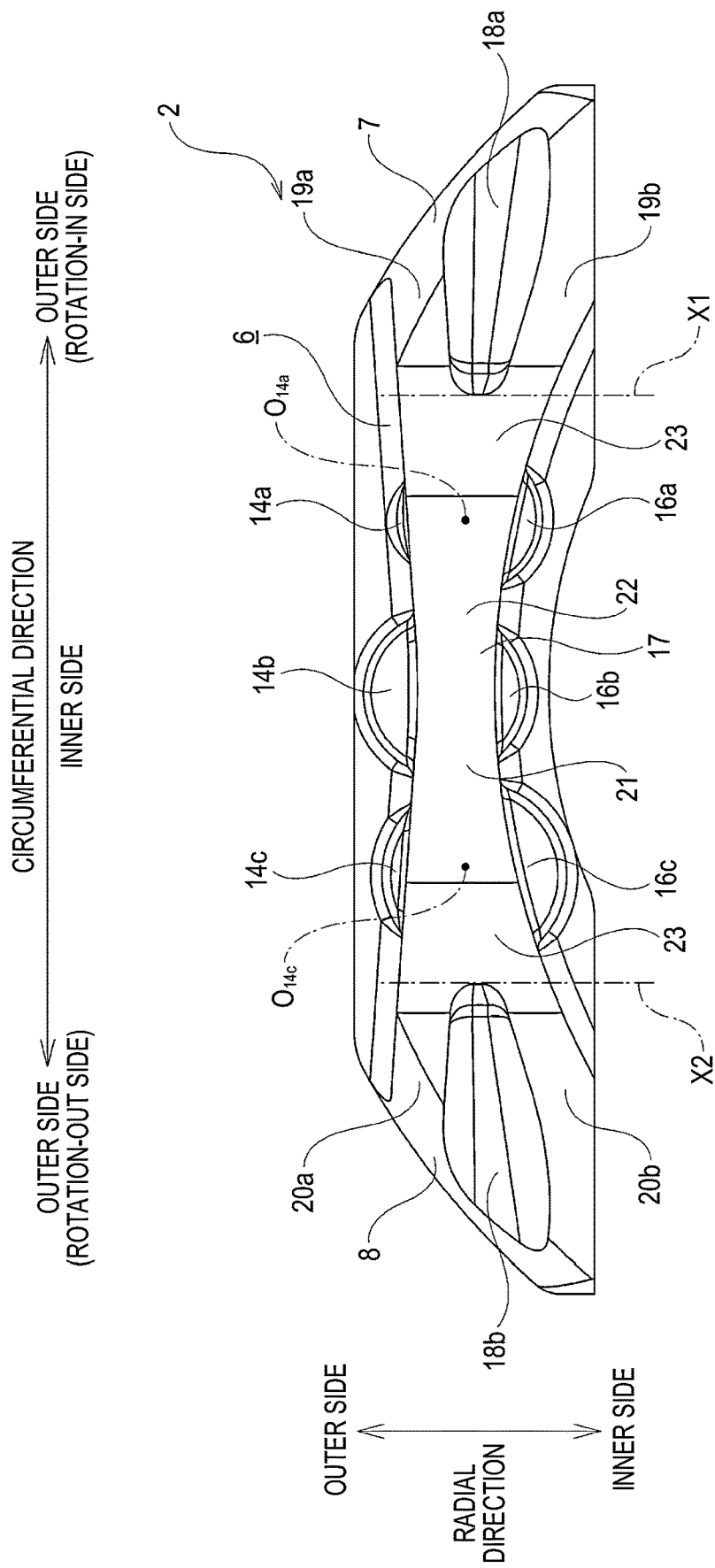
FIG. 2 is a front view of a caliper taken out from the opposed piston type disc brake device according to the first embodiment, as viewed from an axially outer side.

Part of outer shapes of the outer cylinder portions 14a, 14b, and 14c having a bottomed cylindrical shape is exposed in the outer body 6. Specifically, as shown in FIG. 1, outer circumferential side portions of the cylinder portions 15a, 15b, and 15c constituting the outer cylinder portions 14a, 14b, and 14c are exposed on a radially outer side surface of the outer body 6. As shown in FIG. 6, inner circumferential side portions of the cylinder portions 15a, 15b, and 15c constituting the outer cylinder portions 14a, 14b, and 14c are exposed on a radially inner side surface of the outer body 6. Further, as shown in FIG. 2, circular bottom portions 16a, 16b, 16c constituting the outer cylinder portions 14a, 14b, 14c are exposed on an axially outer side surface of the outer body 6.

In the illustrated example, cylinder diameters of the three outer cylinder portions 14a, 14b, and 14c are different from each other. Specifically, among the cylinder diameters of the three outer cylinder portions 14a, 14b, and 14c, the cylinder diameter of the outer cylinder portion 14a disposed on the rotation-in side is the smallest, and the cylinder diameter of the outer cylinder portion 14c disposed on the rotation-out side is the largest.

The outer cylinder portions 14a, 14b, and 14c are disposed coaxially with the inner cylinder portions 9a, 9b, and 9c, respectively.

An outer side reinforcing rib 17 is provided on an axially outer side portion of the outer body 6. The outer side reinforcing rib 17 is a thick portion that is thicker than other portions and rises axially outward. Therefore, a thickness of the outer body 6 is increased at the portion where the outer side reinforcing rib 17 is provided, and rigidity of the outer body 6 is improved. In the present embodiment, the outer side reinforcing rib 17 corresponds to a reinforcing rib described in the claims.

The outer side reinforcing rib 17 is formed in a band shape extending in the circumferential direction, and end portions on both circumferentially outer sides thereof are connected to the rotation-in side connecting portion 7 and the rotation-out side connecting portion 8. The outer side reinforcing rib 17 covers the respective bottom portions 16a, 16b, and 16c constituting the outer cylinder portions 14a, 14b, and 14c from the axially outer side so as to cross the bottom portions 16a, 16b, and 16c in the circumferential direction.

A radially outer side surface of the outer side reinforcing rib 17 is a partially cylindrical surface slightly curved in an arc shape such that a radially inner side thereof is convex. On the other hand, a radially inner side surface of a circumferentially inner side portion of the outer side reinforcing rib 17 is a partially cylindrical surface curved in an arc shape such that a radially outer side thereof is convex. Therefore, a radial width of the circumferentially inner side portion of the outer side reinforcing rib 17 becomes smaller from the circumferentially outer sides toward the circumferentially inner side, and becomes the smallest at a portion covering the bottom portion 16b of the outer cylinder portion 14b disposed at a circumferentially intermediate portion.

The outer side reinforcing rib 17 has, at radially intermediate portions of both circumferentially outer side portions, cut-out portions (lightening portions) 18a, 18b that are recessed in the axial direction. In the present embodiment, each of the cut-out portions 18a, 18b is a bottomed recessed portion.

Each of the cut-out portions 18a, 18b has a shape that is long in the circumferential direction and has a circumferential width larger than a radial width. Specifically, each of the cut-out portion 18a, 18b has a substantially triangular shape when viewed in the axial direction. The radial width of each of the cut-out portion 18a, 18b increases toward the circumferentially outer side.

The cut-out portion 18a disposed on the rotation-in side is open to the axially outer side and the circumferentially outer side (rotation-in side). Further, the cut-out portion 18b disposed on the rotation-out side is open to the axially outer side and the circumferentially outer side (rotation-out side).

In the illustrated example, a corner portion (end portion) on a circumferentially inner side of the cut-out portion 18a disposed on the rotation-in side is located on the circumferentially outer side with respect to the outer cylinder portion 14a disposed on the rotation-in side, and is configured by a concave curved surface in order to suppress concentration of stress. Further, a corner portion on a circumferentially inner side of the cut-out portion 18b disposed on the rotation-out side is also located on the circumferentially outer side with respect to the outer cylinder portion 14c disposed on the rotation-out side, and is configured by a concave curved surface. However, when the present invention is carried out, the corner portion on the circumferentially inner side of each of the cut-out portions disposed on the rotation-in side and the rotation-out side may be disposed at a position overlapping with the bottom portion of the outer cylinder portion, or may be configured by a corner portion instead of a concave curved surface.

The band-shaped outer side reinforcing rib 17 of the present embodiment is configured such that the radially outer side surface thereof is curved such that the radially inner side is convex, the radially inner side surface thereof is curved such that the radially outer side is convex, and the band-shaped outer side reinforcing rib 17 includes one cut-out portion 18a and one cut-out portion 18b each having a substantially triangular shape when viewed in the axial direction, in the radially intermediate portion of each of both the circumferentially outer side portions. Therefore, the outer side reinforcing rib 17 has a bifurcated shape on both the circumferentially outer side portions, and has a substantially X-shape as a whole when viewed in the axial direction.

An axial thickness of the outer side reinforcing rib 17 is not constant in the circumferential direction and varies depending on a circumferential position. Specifically, the axial thickness of the outer side reinforcing rib 17 excluding the cut-out portions 18a, 18b is larger at portions deviated outward in the circumferential direction from the bottom portions 16a, 16b, and 16c of the outer cylinder portions 14a, 14b, and 14c than at portions covering the bottom portions 16a, 16b, and 16c of the outer cylinder portions 14a, 14b, and 14c.

The outer side reinforcing rib 17 includes two side ribs 19a, 19b on both radial sides of the cut-out portion 18a disposed on the rotation-in side, and includes two side ribs 20a, 20b on both radial sides of the cut-out portion 18b disposed on the rotation-out side. Further, the outer side reinforcing rib 17 includes a center rib 21 between the two side ribs 19a, 19b disposed on the rotation-in side and the two side ribs 20a, 20b disposed on the rotation-out side. Therefore, the outer side reinforcing rib 17 of the present embodiment includes the center rib 21 constituting the circumferentially inner side portion of the outer side reinforcing rib 17, and a total of four side ribs 19a, 19b, 20a, 20b constituting both the circumferentially outer side portions of the outer side reinforcing rib 17.

Of the two side ribs 19a, 19b disposed on the rotation-in side, an end portion on a circumferentially outer side of the side rib 19a disposed on a radially outer side of the cut-out portion 18a is connected to the circumferentially inner side portion of the rotation-in side connecting portion 7. An end portion on a circumferentially inner side of the side rib 19a is connected to an end portion on a circumferentially outer side of a radially outer side portion of the center rib 21. On the other hand, of the two side ribs 19a, 19b, an end portion on a circumferentially outer side of the side rib 19b disposed on a radially inner side of the cut-out portion 18a is located on the circumferentially outer side with respect to the end portion on the circumferentially outer side of the side rib 19a, and is connected to an end portion on a circumferentially outer side of the rotation-in side connecting portion 7. Further, an end portion on a circumferentially inner side of the side rib 19b is connected to an end portion on a circumferentially outer side of a radially inner side portion of the center rib 21 at substantially the same circumferential position (X1 position) as the end portion on the circumferentially inner side of the side rib 19a. When the present invention is carried out, the circumferentially inner side portion of the side rib may be connected to the end portion on the circumferentially outer side of the center rib, and may be directly connected to the cylinder portion of the outer cylinder portion on the rotation-in side.

The two side ribs 19a, 19b have slightly different radial thicknesses. Specifically, in parts at the same circumferential position, the radial thickness of the side rib 19a disposed on the radially outer side of the cut-out portion 18a is slightly larger than the radial thickness of the side rib 19b disposed on the radially inner side of the cut-out portion 18a. As shown in FIG. 1, when the caliper 2 is viewed from the radially outer side, a part of the side rib 19b disposed on the radially inner side of the cut-out portion 18a slightly protrudes outward from the side rib 19a disposed on the radially outer side of the cut-out portion 18a. Note that, when the present invention is carried out, most of the side ribs disposed on the radially inner side of the cut-out portion may protrude outward from the side ribs disposed on the radially outer side of the cut-out portion.

Each of the two side ribs 19a, 19b disposed on the rotation-in side extends in a direction approaching a central axis $O_{14a}$ of the outer cylinder portion 14a disposed on the rotation-in side. Therefore, the two side ribs 19a, 19b are non-parallel to each other. The side rib 19a disposed on the radially outer side is inclined in a direction toward the radially inner side as the side rib 19a is toward the circumferentially inner side. On the other hand, the side rib 19b disposed on the radially inner side is inclined in a direction toward the radially outer side as the side rib 19b is toward the circumferentially inner side. An inclination angle between the two side ribs 19a, 19b is about 10° to 60°, and more preferably about 20° to 50°.

An axially outer side surface of each of the side ribs 19a, 19b is substantially linearly inclined in a direction toward the axially inner side as the axially outer side surfaces are toward the circumferentially outer side.

Of the two side ribs 20a, 20b disposed on the rotation-out side, an end portion on a circumferentially outer side of the side rib 20a disposed on a radially outer side of the cut-out portion 18b is connected to a circumferentially inner side portion of the rotation-out side connecting portion 8. An end portion on a circumferentially inner side of the side rib 20a is connected to an end portion on the circumferentially outer side of the radially outer side portion of the center rib 21. On the other hand, of the two side ribs 20a, 20b, an end portion on a circumferentially outer side of the side rib 20b disposed on a radially inner side of the cut-out portion 18b is located on the circumferentially outer side with respect to the end portion on the circumferentially outer side of the side rib 20a, and is connected to an end portion on a circumferentially outer side of the rotation-out side connecting portion 8. Further, an end portion on a circumferentially inner side of the side rib 20b is connected to an end portion on the circumferentially outer side of the radially inner side portion of the center rib 21 at substantially the same circumferential position (X2 position) as the end portion on the circumferentially inner side of the side rib 20a. When the present invention is carried out, the circumferentially inner side portion of the side rib may be connected to the end portion on the circumferentially outer side of the center rib, and may be directly connected to the cylinder portion of the outer cylinder portion on the rotation-out side.

The two side ribs 20a, 20b have slightly different radial thicknesses. Specifically, at the same circumferential position, the radial thickness of the side rib 20a disposed on the radially outer side of the cut-out portion 18b is slightly larger than the radial thickness of the side rib 20b disposed on the radially inner side of the cut-out portion 18b. As shown in FIG. 1, when the caliper 2 is viewed from the radially outer side, a part of the side rib 20b disposed on the radially inner side of the cut-out portion 18b slightly protrudes outward from the side rib 20a disposed on the radially outer side of the cut-out portion 18b. Note that, when the present invention is carried out, most of the side ribs disposed on the radially inner side of the cut-out portion may protrude outward from the side ribs disposed on the radially outer side of the cut-out portion.

Each of the two side ribs 20a, 20b disposed on the rotation-out side extends in a direction approaching a central axis $O_{14c}$ of the outer cylinder portion 14c disposed on the rotation-out side. Therefore, the two side ribs 20a, 20b are non-parallel to each other. The side rib 20a disposed on the radially outer side is inclined in a direction toward the radially inner side as the side rib 20a is toward the circumferentially inner side. On the other hand, the side rib 20b disposed on the radially inner side is inclined in a direction toward the radially outer side as the side rib 20b is toward the circumferentially inner side. An inclination angle between the two side ribs 20a, 20b is the same as the inclination angle between the two side ribs 19a, 19b disposed on the rotation-in side.

An axially outer side surface of each of the side ribs 20a, 20b is substantially linearly inclined in a direction toward the axially inner side as the axially outer side surfaces are toward the circumferentially outer side.

The outer side reinforcing rib 17 of the present embodiment has a symmetrical shape in the axial direction. Therefore, the two side ribs 19a, 19b disposed on the rotation-in side and the two side ribs 20a, 20b disposed on the rotation-out side have symmetrical shapes in the axial direction.

The center rib 21 is provided on the circumferentially inner side portion (intermediate portion) of the outer side reinforcing rib 17. The center rib 21 extends in the circumferential direction, and covers radially intermediate portions of the bottom portions 16a, 16b, and 16c of the three outer cylinder portions 14a, 14b, and 14c from the axially outer side so as to cross the radially intermediate portions in the circumferential direction. Therefore, radially outer side portions and radially inner side portions of the bottom portions 16a, 16b, and 16c of the outer cylinder portions 14a, 14b, and 14c are not covered by the center rib 21 and protrude from the center rib 21 in the radial direction.

A radial width of the center rib 21 is larger than a radial width of each of the side ribs 19a, 19b, 20a, and 20b and smaller than a diameter of each of the bottom portions 16a, 16b, and 16c of the outer cylinder portions 14a, 14b, and 14c. Specifically, the radial width of the center rib 21 is about two to three times the radial width of each of the side ribs 19a, 19b, 20a, and 20b at both circumferentially outer side portions having the largest radial width, and is about 1.2 to 1.5 times the radial width of each of the side ribs 19a, 19b, 20a, and 20b at a circumferentially central portion having the smallest radial width.

End portions on both circumferentially outer sides of the center rib 21 are respectively connected in the circumferential direction to end portions on the circumferentially inner side of the side ribs 19a, 19b disposed on the rotation-in side and to end portions on the circumferentially inner side of the side ribs 20a, 20b disposed on the rotation-out side. A boundary position between the end portion on the circumferentially outer side and on a rotation-in side of the center rib 21 and the end portions on the circumferentially inner side of the side ribs 19a, 19b disposed on the rotation-in side is a position indicated by X1 in FIG. 2, and a boundary position between the end portion on the circumferentially outer side and on a rotation-out side of the center rib 21 and the end portions on the circumferentially inner side of the side ribs 20a, 20b disposed on the rotation-out side is a position indicated by X2 in FIG. 2.

The center rib 21 has a design surface 22 having a flat surface shape, which can be used for displaying characters, figures, and the like, at a circumferentially central portion of an axially outer side surface, and has curved surface portions 23 at both circumferentially outer side portions of the axially outer side surface. The design surface 22 of the center rib 21 and the axially outer side surfaces of the four side ribs 19a, 19b, 20a, and 20b are smoothly connected to each other without steps through the curved surface portions 23. When the present invention is carried out, the design surface of the center rib and the axially outer side surfaces of the side ribs may be directly and smoothly connected without a step.

A radially outer side surface of the center rib 21 is a partially cylindrical surface slightly curved in an arc shape such that the radially inner side is convex, and a radially inner side surface of the center rib 21 is a partially cylindrical surface curved in an arc shape such that the radially outer side is convex. In the present embodiment, the radially outer side surface of the center rib 21 and the radially outer side surfaces of the pair of side ribs 19a, 20a disposed on the radially outer side portion are smoothly connected in the circumferential direction. Further, the radially inner side surface of the center rib 21 and the radially inner side surfaces of the pair of side ribs 19b, 20b disposed on the radially inner side portion are smoothly connected to each other in the circumferential direction.

The outer body 6 supports the pad 3 disposed on the axially outer side of the rotor 4 to be movable in the axial direction. Therefore, outer side protruding portions 29 protruding in the axial direction are formed on both circumferentially outer side portions of the axially inner side surface of the outer body 6.

<<Rotation-In Side Connecting Portion and Rotation-Out Side Connecting Portion>>

The rotation-in side connecting portion 7 and the rotation-out side connecting portion 8 are disposed radially outward of an outer circumferential edge of the rotor 4. Further, the rotation-in side connecting portion 7 connects an end portion on the circumferentially outer side and on a rotation-in side of the inner body 5 and an end portion on the circumferentially outer side and on a rotation-in side of the outer body 6, in the axial direction. The rotation-out side connecting portion 8 connects an end portion on the circumferentially outer side and on the rotation-out side of the inner body 5 and an end portion on the circumferentially outer side and on the rotation-out side of the outer body 6, in the axial direction. The rotation-in side connecting portion 7 and the rotation-out side connecting portion 8 have a partially cylindrical shape curved in an arc shape, and cover the rotor 4 from the radially outer side. A rotor path portion 24, which is a recessed portion for allowing an outer circumferential edge portion of the rotor 4 to enter, is provided on the inner circumferential surface of each of the rotation-in side connecting portion 7 and the rotation-out side connecting portion 8. A portion whose four sides are surrounded by the inner and outer bodies 5, 6 and the rotation-in side and rotation-out side connecting portions 7, 8 is an opening portion 25 having a substantially rectangular shape in plan view and penetrating in the radial direction.

<<Communication Path>>

Figure 8:
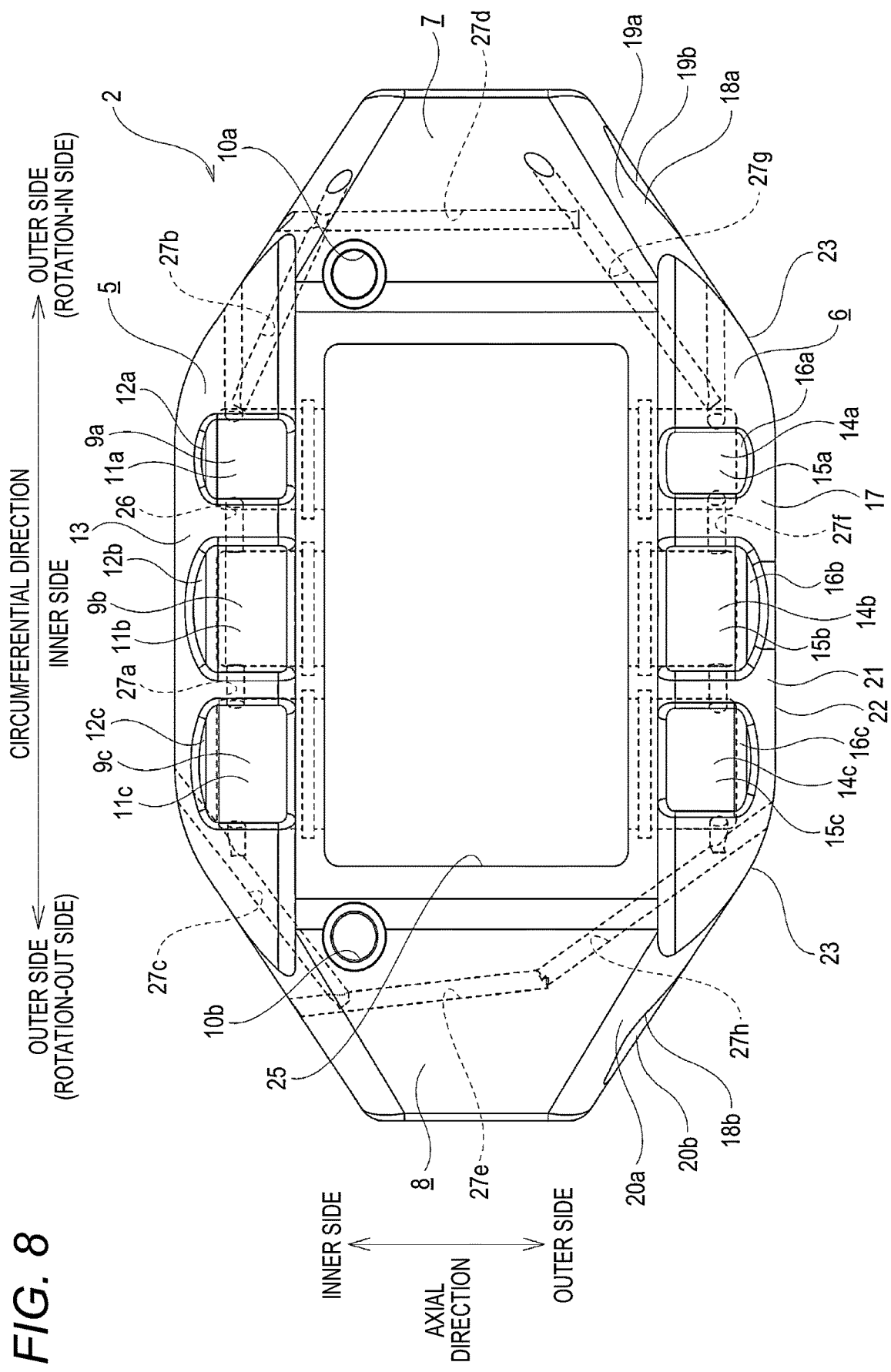
FIG. 8 is a see-through view of the caliper taken out from the opposed piston type disc brake device according to the first embodiment, as viewed from a radially outer side.

As shown in FIG. 8, a communication path 26 for allowing brake oil to pass therethrough is provided inside the caliper 2. The brake oil is fed from a master cylinder into the communication path 26. The communication path 26 includes a total of eight through holes from a first through hole 27a to an eighth through hole 27h.

Each of the first through hole 27a to the third through hole 27c is provided inside the inner body 5. The first through hole 27a extends linearly in the circumferential direction so as to cross each of the inner cylinder portions 9a, 9b, and 9c. The second through hole 27b is disposed on the rotation-in side with respect to the inner cylinder portion 9a on the rotation-in side, and communicates with the first through hole 27a. The second through hole 27b extends obliquely in a direction toward the rotation-in side as the second through hole 27b is toward the axially outer side. Most of the third through hole 27c is disposed on the rotation-out side with respect to the inner cylinder portion 9c on the rotation-out side, and communicates with the first through hole 27a. The third through hole 27c extends obliquely in a direction toward the rotation-out side as the third through hole 27c is toward the axially outer side.

The fourth through hole 27d is provided inside the rotation-in side connecting portion 7 and extends in the axial direction. An axially inner side portion of the fourth through hole 27d communicates with the second through hole 27b. The fifth through hole 27e is provided inside the rotation-out side connecting portion 8 and extends in the axial direction. An axially inner side portion of the fifth through hole 27e communicates with the third through hole 27c.

Each of the sixth through hole 27f to the eighth through hole 27h is provided inside the outer body 6. The sixth through hole 27f extends linearly in the circumferential direction so as to cross each of the outer cylinder portions 14a, 14b, and 14c. The seventh through hole 27g is disposed on the rotation-in side with respect to the outer cylinder portion 14a on the rotation-in side, and communicates with the fourth through hole 27d and the sixth through hole 27f. The seventh through hole 27g extends obliquely in a direction toward the rotation-in side as the seventh through hole 27g is toward the axially inner side. Most of the eighth through hole 27h is disposed on the rotation-out side with respect to the outer cylinder portion 14c on the rotation-out side, and communicates with the fifth through hole 27e and the sixth through hole 27f. The eighth through hole 27h extends obliquely in a direction toward the rotation-out side as the eighth through hole 27h is toward the axially inner side.

In the present embodiment, the seventh through hole 27g constituting the communication path 26 is formed inside, of the pair of side ribs 19a and 19b disposed on the rotation-in side, the side rib 19a disposed on the radially outer side. The seventh through hole 27g is opened in the axially outer side surface of the side rib 19a. Further, the eighth through hole 27h constituting the communication path 26 is formed inside, of the pair of side ribs 20a, 20b disposed on the rotation-out side, the side rib 20a disposed on the radially outer side. The eighth through hole 27h is opened in the axially outer side surface of the side rib 20a.

<Pad>

As shown in FIG. 1, each of the pair of pads 3 includes a lining (friction material) 30 and a metal back plate (pressure plate) 31 supporting a back surface of the lining 30.

In the present embodiment, the inner side pad 3 (inner pad) disposed on the axially inner side of the rotor 4 is disposed between the pair of inner side protruding portions 28, and the end portions on both circumferentially outer sides of the back plate 31 constituting the inner side pad 3 are engaged with the pair of inner side protruding portions 28 so as to be movable in the axial direction. Thus, the inner side pad 3 is supported to be movable in the axial direction with respect to the inner body 5.

Further, the outer side pad 3 (outer pad) disposed on the axially outer side of the rotor 4 is disposed between the pair of outer side protruding portions 29, and the end portions on both the circumferentially outer sides of the back plate 31 constituting the outer side pad 3 are engaged with the pair of outer side protruding portions 29 so as to be movable in the axial direction. Accordingly, the outer side pad 3 is supported to be movable in the axial direction with respect to the outer body 6.

Although not shown in the drawings, a pad clip may be interposed between both circumferentially outer side surfaces of the back plate 31 constituting each of the pair of pads 3 and circumferentially inner side surfaces of the inner side protruding portion 28 and the outer side protruding portion 29. When the present invention is carried out, a support structure of the pair of pads 3 with respect to both the inner and outer bodies 5, 6 is not limited to the above-described structure, and various structures in the related art may be adopted.

In the case of the opposed piston type disc brake device 1 of the present embodiment as described above, at the time of braking, the brake oil is also fed from the master cylinder to each of the inner cylinder portions 9a, 9b, 9c and the outer cylinder portions 14a, 14b, 14c through the communication path 26. As a result, the inner pistons fitted to the inner cylinder portions 9a, 9b, and 9c are pushed out in the axial direction, and the inner side pad 3 supported by the inner body 5 is pressed against an axially inner side surface of the rotor 4. Similarly, the outer pistons fitted to the outer cylinder portions 14a, 14b, and 14c are pushed out in the axial direction, and the outer side pad 3 supported by the outer body 6 is pressed against the axially outer side surface of the rotor 4. As a result, the rotor 4 is strongly clamped by the pair of pads 3 from both axial sides, and the vehicle is braked.

In particular, in the case of the present embodiment, for the caliper 2 constituting the opposed piston type disc brake device 1, it is possible to ensure the rigidity and reduce the weight at a high level.

[Reason Why Rigidity Can Be Improved]

In the caliper 2 of the present embodiment, the bottom portions 16a, 16b, and 16c of the outer cylinder portions 14a, 14b, and 14c are covered from the axially outer side by the band-shaped outer side reinforcing rib 17 (center rib 21). Therefore, the rigidity of the bottom portions 16a, 16b, and 16c of the outer cylinder portions 14a, 14b, and 14c of the outer body 6 in the axial direction can be improved. Therefore, at the time of braking, since the bottom portions 16a, 16b, and 16c of the outer cylinder portions 14a, 14b, and 14c can be suppressed from being elastically deformed axially outward, the inner body 5 and the outer body 6 can be suppressed from being elastically deformed in directions away from each other in the axial direction. Accordingly, according to the opposed piston type disc brake device 1 of the present embodiment, a desired braking force can be obtained. Further, since the outer side reinforcing rib 17 extends in the circumferential direction and end portions on both circumferential sides thereof are connected to the rotation-in side connecting portion 7 and the rotation-out side connecting portion 8, respectively, the rigidity of the outer body 6 in the circumferential direction can also be improved. Therefore, at the time of braking, it is possible to suppress elastic deformation of the outer body 6 with respect to the inner body 5 such that the outer body 6 is displaced in the circumferential direction (the rotation direction of the rotor 4), and it is also possible to suppress vibration and noise.

Further, in the present embodiment, each of the pair of side ribs 19a, 19b disposed on the circumferentially outer side portion on a rotation-in side of the outer side reinforcing rib 17 is extended in a direction approaching the central axis $O_{14a}$ of the outer cylinder portion 14a on the rotation-in side, and the pair of side ribs 19a, 19b are non-parallel to each other. Further, each of the pair of side ribs 20a, 20b disposed on the circumferentially outer side portion on the rotation-out side of the outer side reinforcing rib 17 is extended in a direction approaching the central axis $O_{14c}$ of the outer cylinder portion 14c on the rotation-out side, and the pair of side ribs 20a, 20b are non-parallel to each other. Therefore, torsional rigidity of the outer body 6 can be improved, and the bottom portions 16a, 16b, and 16c of the outer cylinder portions 14a, 14b, and 14c can be suppressed from being elastically deformed axially outward.

Further, in the present embodiment, of the pair of side ribs 19a, 19b disposed on the rotation-in side, the radial thickness of the side rib 19a disposed on the radially outer side is slightly larger than the radial thickness of the side rib 19b disposed on the radially inner side. Further, of the pair of side ribs 20a, 20b disposed on the rotation-out side, the radial thickness of the side rib 20a disposed on the radially outer side is slightly larger than the radial thickness of the side rib 20b disposed on the radially inner side. Accordingly, since a radial compressive stress of the side ribs 19a, 20a disposed on the radially outer side can be increased, the outer body 6 can be effectively suppressed from being elastically deformed in the direction away from the inner body 5 in the axial direction at the time of braking.

When the caliper 2 is viewed from the radially outer side, of the pair of side ribs 19a, 19b disposed on the rotation-in side, the side rib 19b disposed on the radially inner side protrudes outward from the side rib 19a disposed on the radially outer side. Similarly, of the pair of side ribs 20a, 20b disposed on the rotation-out side, the side rib 20b disposed on the radially inner side protrudes outward from the side rib 20a disposed on the radially outer side. Accordingly, since a tensile stress in the axial direction and/or the circumferential direction of the side ribs 19b, 20b disposed on the radially inner side can be increased, the outer body 6 can be effectively suppressed from being elastically deformed in the direction away from the inner body 5 in the axial direction at the time of braking.

[Reasons for Achieving Weight Reduction]

In the caliper 2 of the present embodiment, the cut-out portions 18a, 18b are provided on both circumferentially outer side portions of the outer side reinforcing rib 17. In other words, the cut-out portions 18a, 18b are provided without providing the outer side reinforcing rib at portions that do not sufficiently contribute to improvement in rigidity. Therefore, it is possible to reduce the weight of the caliper 2 while ensuring the rigidity of the caliper 2. In particular, in the present embodiment, since the cut-out portions 18a, 18b are provided at portions deviated outward in the circumferential direction from the bottom portions 16a, 16c of the outer cylinder portions 14a, 14c, it is possible to achieve the weight reduction while sufficiently reinforcing the bottom portions 16a, 16b, and 16c.

Further, the radial width of the center rib 21 constituting the outer side reinforcing rib 17 is made smaller than the diameter of each of the bottom portions 16a, 16b, 16c of the outer cylinder portions 14a, 14b, 14c, and only the radially intermediate portions of the bottom portions 16a, 16b, 16c of the outer cylinder portions 14a, 14b, 14c are covered by the center rib 21. Therefore, it is possible to suppress the weight of the caliper 2 from being unnecessarily increased by providing the outer side reinforcing rib 17.

Further, in the present embodiment, the seventh through hole 27g constituting the communication path 26 is formed inside the side rib 19a disposed on the rotation-in side and on the radially outer side, and the eighth through hole 27h constituting the communication path 26 is formed inside the side rib 20a disposed on the rotation-out side and on the radially outer side. Therefore, since it is not necessary to provide a pipe for passing the brake oil outside, the number of components can be reduced and the weight can be reduced.

As a result, according to the caliper 2 of the present embodiment, the rigidity can be ensured and the weight can be reduced at a high level.

Further, in the present embodiment, the design surface 22 of the center rib 21 and the axially outer side surfaces of the four side ribs 19a, 19b, 20a, 20b are smoothly connected to each other without steps through the curved surface portions 23. Therefore, the design of the caliper 2 from the axially outer side can be improved. It is also possible to suppress the concentration of stress on connection portions between the center rib 21 and the side ribs 19a, 19b, 20a, and 20b.

Second Embodiment

Figure 9:
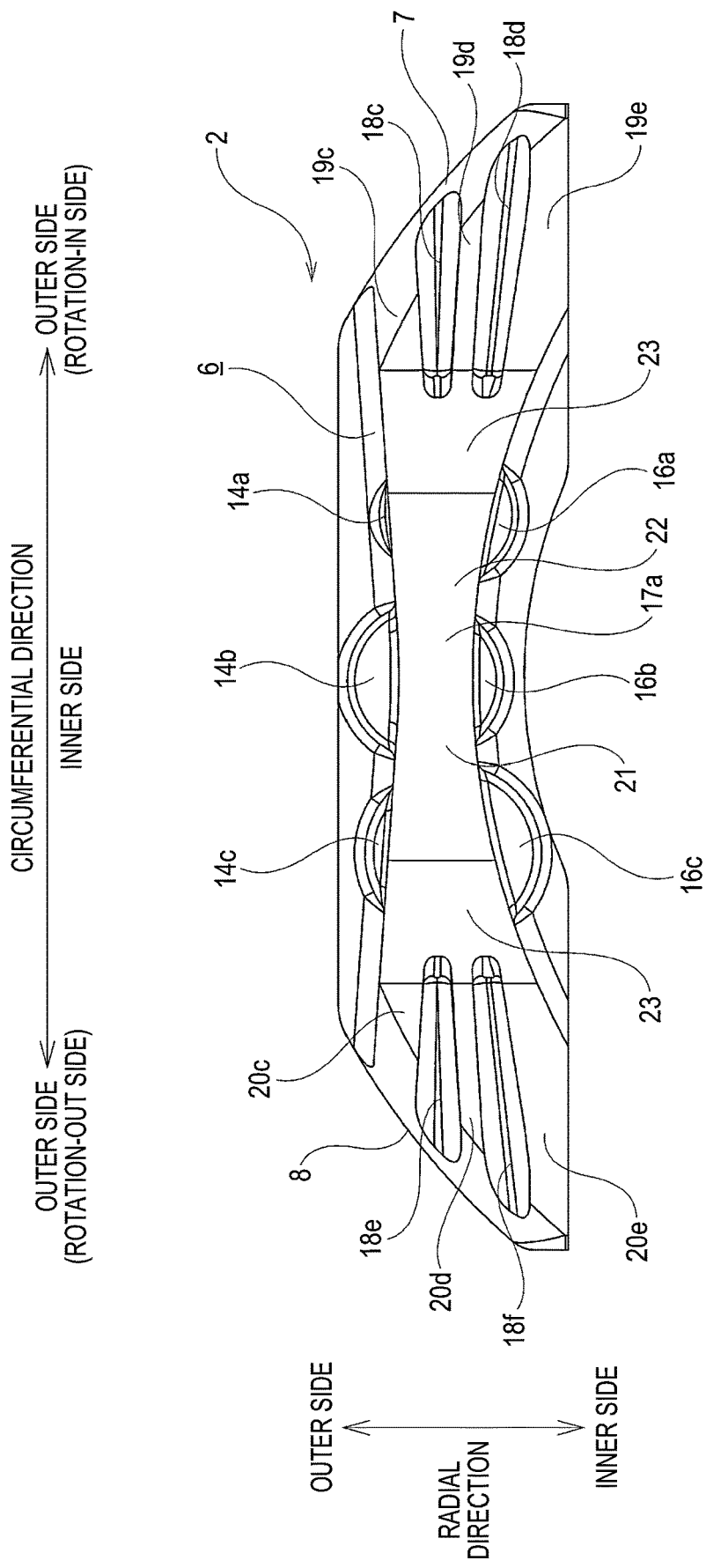
FIG. 9 is a diagram corresponding to FIG. 2, showing a second embodiment.

A second embodiment will be described with reference to FIG. 9.

In the present embodiment, only structures of both circumferentially outer side portions of the outer side reinforcing rib 17a are changed from the structure of the first embodiment.

Specifically, in the present embodiment, two bottomed cut-out portions 18c, 18d are provided side by side in the radial direction at a radially intermediate portion of a circumferentially outer side portion on a rotation-in side of the outer side reinforcing rib 17a, and two bottomed cut-out portions 18e, 18f are provided side by side in the radial direction at a radially intermediate portion of a circumferentially outer side portion on a rotation-out side of the outer side reinforcing rib 17a.

Each of the four cut-out portions 18c to 18f has a shape that is long in the circumferential direction and has a circumferential width larger than a radial width. Specifically, each of the four cut-out portions 18c to 18f has a substantially triangular shape when viewed in the axial direction. The radial width of each of the cut-out portions 18c to 18f increases toward the circumferentially outer side.

Of the two cut-out portions 18c, 18d disposed on the rotation-in side, the cut-out portion 18d disposed on the radially inner side has a circumferential length longer than that of the cut-out portion 18c disposed on the radially outer side. An end portion on a circumferentially outer side of the cut-out portion 18d disposed on the radially inner side is located on the circumferentially outer side of an end portion on a circumferentially outer side of the cut-out portion 18c disposed on the radially outer side. Further, of the two cut-out portions 18e, 18f disposed on the rotation-out side, the cut-out portion 18f disposed on the radially inner side has a circumferential length longer than that of the cut-out portion 18e disposed on the radially outer side. An end portion on a circumferentially outer side of the cut-out portion 18f disposed on the radially inner side is located on the circumferentially outer side of an end portion on a circumferentially outer side of the cut-out portion 18e disposed on the radially outer side.

The outer side reinforcing rib 17a includes three side ribs 19c, 19d, and 19e so as to sandwich each of the two cut-out portions 18c, 18d disposed on the rotation-in side from both radial sides. Specifically, the side ribs 19c, 19d are provided on both the radial sides of the cut-out portion 18c on the radially outer side, and the side ribs 19d, 19e are provided on both the radial sides of the cut-out portion 18d on the radially inner side. Further, the outer side reinforcing rib 17a includes three side ribs 20c, 20d, and 20e so as to sandwich each of the two cut-out portions 18e, 18f disposed on the rotation-out side from both radial sides. Specifically, the side ribs 20c, 20d are provided on both the radial sides of the cut-out portion 18e on the radially outer side, and the side ribs 20d, 20e are provided on both the radial sides of the cut-out portion 18f on the radially inner side. Therefore, the outer side reinforcing rib 17a of the present embodiment has a total of six side ribs 19c, 19d, 19e, 20c, 20d, 20e.

The three side ribs 19c, 19d, and 19e disposed on the rotation-in side are non-parallel to each other. The side rib 19c disposed on the radially outer side is inclined in a direction toward the radially inner side as the side rib 19c is toward the circumferentially inner side. On the other hand, the side rib 19d disposed on the radially intermediate portion and the side rib 19e disposed on the radially inner side are inclined in a direction toward the radially outer side as the side ribs 19d, 19e are toward the circumferentially inner side.

An end portion on a circumferentially outer side of the side rib 19c disposed on the radially outer side is connected to a circumferentially inner side portion of the rotation-in side connecting portion 7. An end portion on a circumferentially outer side of the side rib 19d disposed on the radially intermediate portion is connected to a circumferentially intermediate portion of the rotation-in side connecting portion 7. An end portion on a circumferentially outer side of the side rib 19e disposed on the radially inner side is connected to an end portion on a circumferentially outer side of the rotation-in side connecting portion 7. End portions on circumferentially inner sides of the three side ribs 19c, 19d, and 19e disposed on the rotation-in side are connected to the end portion on the circumferentially outer side and on a rotation-in side of the center rib 21.

The three side ribs 20c, 20d, and 20e disposed on the rotation-out side are non-parallel to each other. The side rib 20c disposed on the radially outer side is inclined in a direction toward the radially inner side as the side rib 20c is toward the circumferentially inner side. On the other hand, the side rib 20d disposed on the radially intermediate portion and the side rib 20e disposed on the radially inner side are inclined in a direction toward the radially outer side as the side ribs 20d, 20e are toward the circumferentially inner side.

An end portion on a circumferentially outer side of the side rib 20c disposed on the radially outer side is connected to a circumferentially inner side portion of the rotation-out side connecting portion 8. An end portion on a circumferentially outer side of the side rib 20d disposed on the radially intermediate portion is connected to a circumferentially intermediate portion of the rotation-out side connecting portion 8. The end portion on the circumferentially outer side of the side rib 19e disposed on the radially inner side is connected to an end portion on a circumferentially outer side of the rotation-out side connecting portion 8. End portions on circumferentially inner sides of the three side ribs 20c, 20d, and 20e disposed on the rotation-out side are connected to the end portion on the circumferentially outer side on the rotation-out side of the center rib 21.

In the present embodiment as described above, compared to the structure of the first embodiment, since the number of the cut-out portions can be increased by two, the weight of the caliper 2 can be further reduced.

Other configurations, operations, and effects are the same as those of the first embodiment.

Third Embodiment

Figure 10:
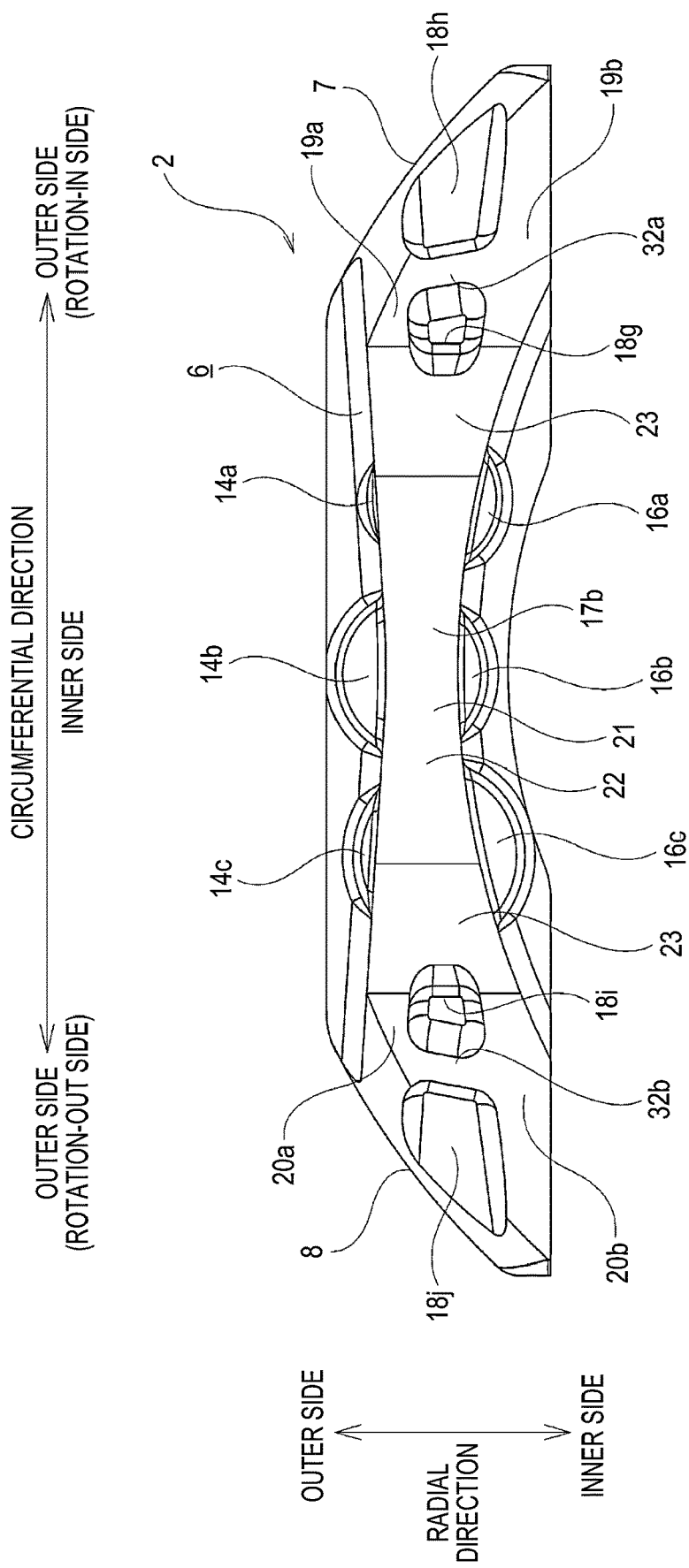
FIG. 10 is a diagram corresponding to FIG. 2, showing a third embodiment.

A third embodiment will be described with reference to FIG. 10.

In the present embodiment, only structures of both circumferentially outer side portions of the outer side reinforcing rib 17b are changed from the structure of the first embodiment.

Specifically, the outer side reinforcing rib 17b of the present embodiment further includes a radial rib 32a that connects circumferentially intermediate portions of the two side ribs 19a, 19b disposed on the rotation-in side in the radial direction. The radial rib 32a divides the cut-out portion 18a (see FIG. 2) provided at a portion between the two side ribs 19a and 19b into two in the circumferential direction. In other words, in the outer side reinforcing rib 17b, two cut-out portions 18g, 18h are provided side by side in the circumferential direction at the portion between the two side ribs 19a, 19b. Of the two cut-out portions 18g, 18h, the cut-out portion 18g disposed on the circumferentially inner side opens only to the axially outer side, but the cut-out portion 18h disposed on the circumferentially outer side opens to the axially outer side and the circumferentially outer side.

Further, the outer side reinforcing rib 17b further includes a radial rib 32b that connects circumferentially intermediate portions of the two side ribs 20a, 20b disposed on the rotation-out side in the radial direction. The radial rib 32b divides the cut-out portion 18b (see FIG. 2) provided at a portion between the two side ribs 20a, 20b into two in the circumferential direction. In other words, in the outer side reinforcing rib 17b, two cut-out portions 18i, 18j are provided side by side in the circumferential direction at the portion between the two side ribs 20a, 20b. Of the two cut-out portions 18i, 18j, the cut-out portion 18i disposed on the circumferentially inner side opens only to the axially outer side, but the cut-out portion 18j disposed on the circumferentially outer side opens to the axially outer side and the circumferentially outer side.

In the present embodiment as described above, since the two side ribs 19a, 19b disposed on the rotation-in side are connected in the radial direction by the radial rib 32a, and the two side ribs 20a, 20b disposed on the rotation-out side are connected in the radial direction by the radial rib 32b, it is possible to further improve the rigidity of the outer body 6. Therefore, it is possible to effectively suppress elastic deformation of the outer body 6 in a direction away from the inner body 5 in the axial direction during braking.

Other configurations, operations, and effects are the same as those of the first embodiment.

Fourth Embodiment

Figure 11:
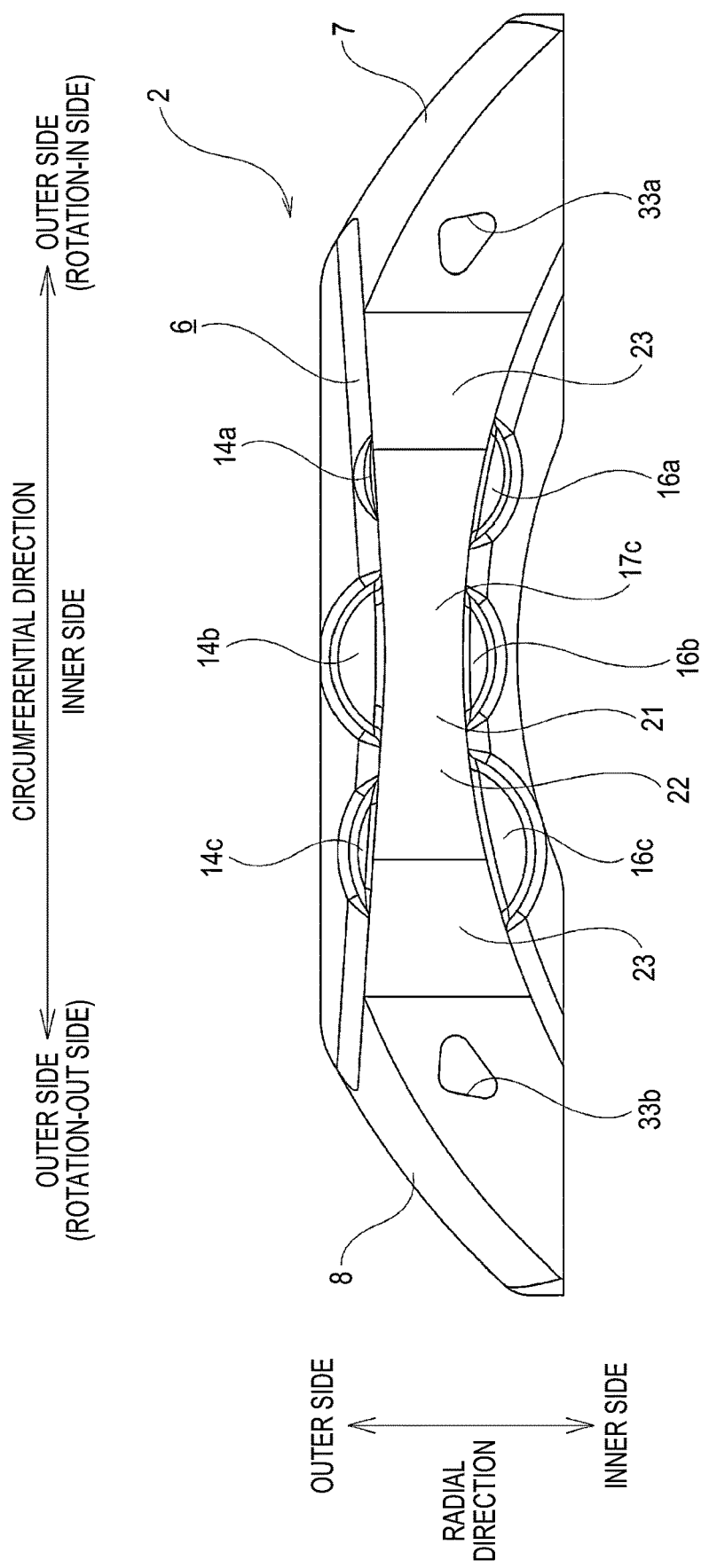
FIG. 11 is a diagram corresponding to FIG. 2, showing a fourth embodiment.
Figure 12:
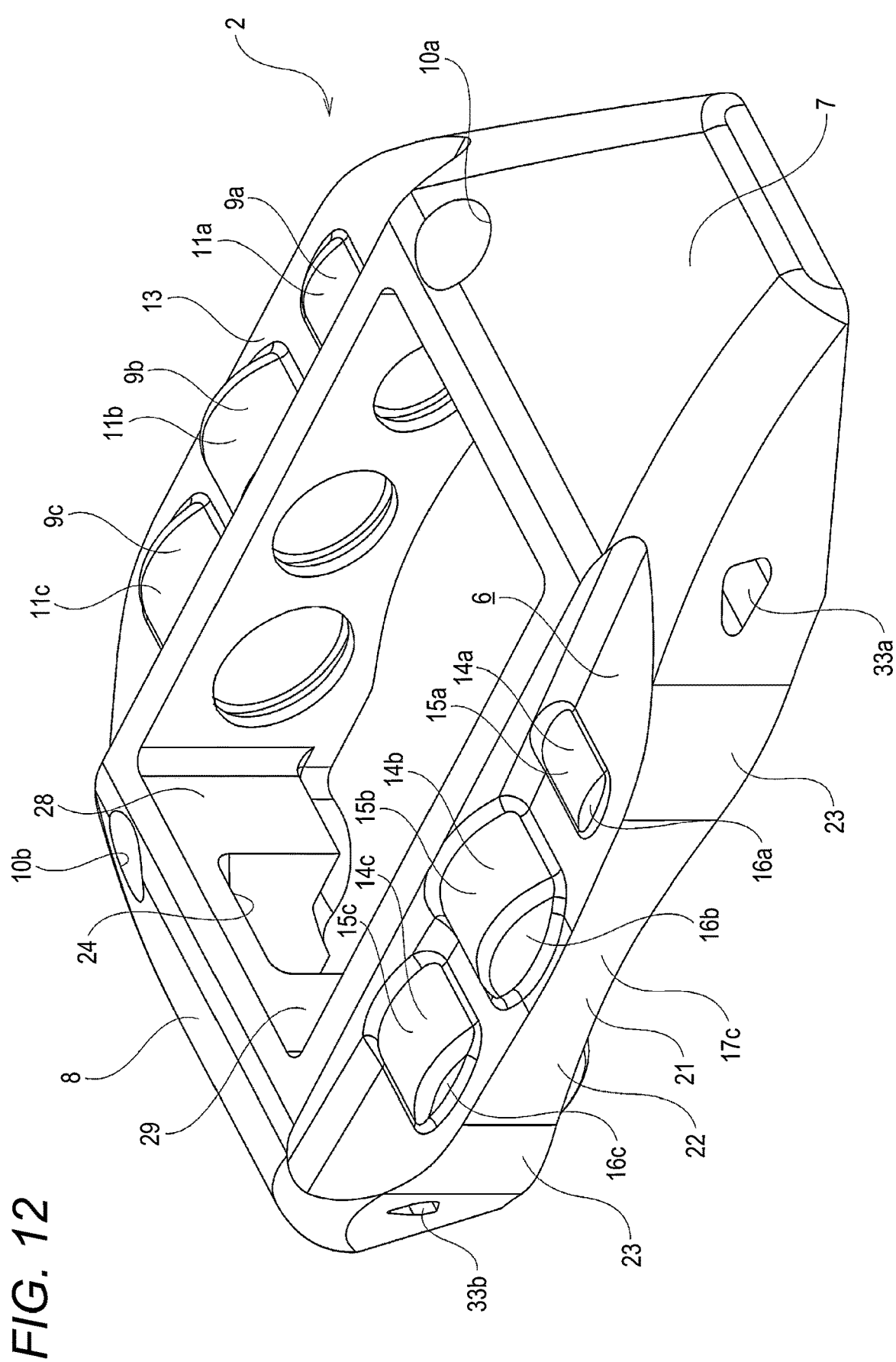
FIG. 12 is a diagram corresponding to FIG. 7, showing the fourth embodiment.

A fourth embodiment will be described with reference to FIGS. 11 and 12.

In the present embodiment, only structures of the cut-out portions 33a, 33b provided on both circumferentially outer side portions of the outer side reinforcing rib 17c are changed from the structure of the first embodiment.

Specifically, in the present embodiment, the bottomless cut-out portion 33a, which is a through hole, is provided at a radially intermediate portion of a circumferentially outer side portion on a rotation-in side of the outer side reinforcing rib 17c, and the bottomless cut-out portion 33b, which is a through hole, is provided at a radially intermediate portion of a circumferentially outer side portion on a rotation-out side of the outer side reinforcing rib 17c.

Each of the cut-out portions 33a, 33b is a triangular hole having a substantially right-angled triangular shape as viewed in the axial direction. Each of the cut-out portions 33a, 33b is deeper in the axial direction and shorter in the circumferential direction than the bottomed cut-out portions 18a, 18b (see FIG. 2) of the first embodiment.

In the present embodiment as described above, since each of the cut-out portions 33a, 33b provided at both circumferentially outer side portions of the outer side reinforcing rib 17c is a bottomless through hole, when the weight of the caliper 2 is the same as that of the structure of the first embodiment, a circumferential dimension of the cut-out portions 33a, 33b can be made shorter compared with the structure of the first embodiment. Therefore, unevenness of an axially outer side surface of the outer body 6 can be reduced, and the degree of freedom of design can be improved. Further, a heat dissipation effect of the caliper 2 can also be enhanced.

Other configurations, operations, and effects are the same as those of the first embodiment.

Although the embodiments of the present invention have been described above, the present invention is not limited thereto, and can be appropriately changed without departing from the technical concept of the invention. Further, the structures of the embodiments can be appropriately combined and implemented as long as no contradiction occurs.

In the embodiments, a structure in which the cut-out portions are provided on both circumferentially outer side portions of the outer side reinforcing rib has been described, but when the present invention is carried out, the arrangement and the number of the cut-out portions are not limited to the structures shown in the embodiments. For example, when the present invention is carried out, the cut-out portion may be provided only on the circumferentially outer side portion on the rotation-in side or only on the circumferentially outer side portion on the rotation-out side. Further, in the case where a plurality of cut-out portions are provided, bottomed cut-out portions and bottomless cut-out portion portions may be provided in combination. Further, the number and the shape of the cut-out portions provided on the circumferentially outer side portion on the rotation-in side may be different from the number and the shape of the cut-out portions provided on the circumferentially outer side portion on the rotation-out side.

When the present invention is carried out, the caliper for an opposed piston type disc brake may have a monocoque structure (integral structure) integrally formed of a material such as an aluminum alloy, or may have a structure in which an inner body and an outer body are connected by a bolt. The number of the inner cylinder portions and the number of the outer cylinder portions are not limited to three as described in the embodiment, and may be one, two, or four or more.

What is claimed is:

1. A caliper for an opposed piston type disc brake, comprising:
an inner body including an inner cylinder portion and disposed on an axially inner side of a rotor;
an outer body including an outer cylinder portion and disposed on an axially outer side of the rotor; and
a rotation-in side connecting portion and a rotation-out side connecting portion which are disposed radially outward of an outer circumferential edge of the rotor and which connect end portions on both circumferentially outer sides of the inner body and end portions on both circumferentially outer sides of the outer body in an axial direction,
wherein the end portions on both circumferentially outer sides of the outer body are connected to the rotation-in side connecting portion and the rotation-out side connecting portion, and the outer body includes a band-shaped reinforcing rib that covers a bottom portion of the outer cylinder portion from an axially outer side so as to cross the bottom portion in a circumferential direction,
wherein the reinforcing rib includes a bottomed or bottomless cut-out portion recessed in the axial direction on at least one of both circumferentially outer side portions of the reinforcing rib, wherein one of the cut-out portion is provided on a radially intermediate portion of each of the both circumferentially outer side portions of the reinforcing rib, wherein each of the cut-out portions has a substantially triangular shape when viewed in the axial direction, and a radial width thereof increases toward a circumferentially outer side, and wherein a portion of the reinforcing rib excluding the cut-out portions has a substantially X-shape when viewed in the axial direction.

2. The caliper for an opposed piston type disc brake according to claim 1, wherein the cut-out portion has a shape elongated in the circumferential direction, wherein the reinforcing rib includes side ribs extending in the circumferential direction on both radial sides of the cut-out portion, and wherein a total of two or more of the side ribs are provided.

3. The caliper for an opposed piston type disc brake according to claim 2, wherein each of the side ribs extends in a direction closer to a central axis of the outer cylinder portion as each of the side ribs is toward a circumferentially inner side.

4. The caliper for an opposed piston type disc brake according to claim 3, wherein the cut-out portion is provided on a radially intermediate portion of the reinforcing rib, wherein the side rib disposed on a radially outer side of the cut-out portion is inclined in a direction toward a radially inner side as the side rib is toward the circumferentially inner side, and wherein the side rib disposed on a radially inner side of the cut-out portion is inclined in a direction toward a radially outer side as the side rib is toward the circumferentially inner side.

5. The caliper for an opposed piston type disc brake according to claim 4, wherein the side rib disposed on the radially inner side of the cut-out portion is connected to an end portion on a circumferentially outer side of the rotation-in side connecting portion or the rotation-out side connecting portion.

6. The caliper for an opposed piston type disc brake according to claim 2, wherein a radial thickness of the side rib disposed on a radially outer side of the cut-out portion is larger than a radial thickness of the side rib disposed on a radially inner side of the cut-out portion.

7. The caliper for an opposed piston type disc brake according to claim 2, wherein when viewed from a radially outer side, the side rib disposed on a radially inner side of the cut-out portion protrudes outward from the side rib disposed on a radially outer side of the cut-out portion.

8. The caliper for an opposed piston type disc brake according to claim 2, wherein the reinforcing rib has a design surface having a flat surface shape formed by an axially outer side surface of the reinforcing rib on a circumferentially inner side portion thereof, and wherein the design surface and axially outer side surfaces of the side ribs are smoothly connected to each other without steps.

9. The caliper for an opposed piston type disc brake according to claim 2, wherein axially outer side surfaces of the side ribs are inclined in a direction toward an axially inner side as the axially outer side surfaces are toward a circumferentially outer side.

10. The caliper for an opposed piston type disc brake according to claim 2, wherein at least one of the side ribs includes a communication path through which brake oil is to pass.

11. The caliper for an opposed piston type disc brake according to claim 1, wherein an axial thickness of the portion of the reinforcing rib excluding the cut-out portions is larger at a portion deviated outward in the circumferential direction from the outer cylinder portion than at a portion covering the bottom portion of the outer cylinder portion.

12. The caliper for an opposed piston type disc brake according to claim 1, wherein the cut-out portion is bottomed.

13. The caliper for an opposed piston type disc brake according to claim 1, wherein the cut-out portion is bottomless.

* * * * *